E. GERSTKEMPER.
MOUNTED EXTENSION FOR BAND CUTTERS AND FEEDERS.
APPLICATION FILED SEPT. 23, 1908.
915,425.
Patented Mar. 16, 1909.
2 SHEETS—SHEET 1.
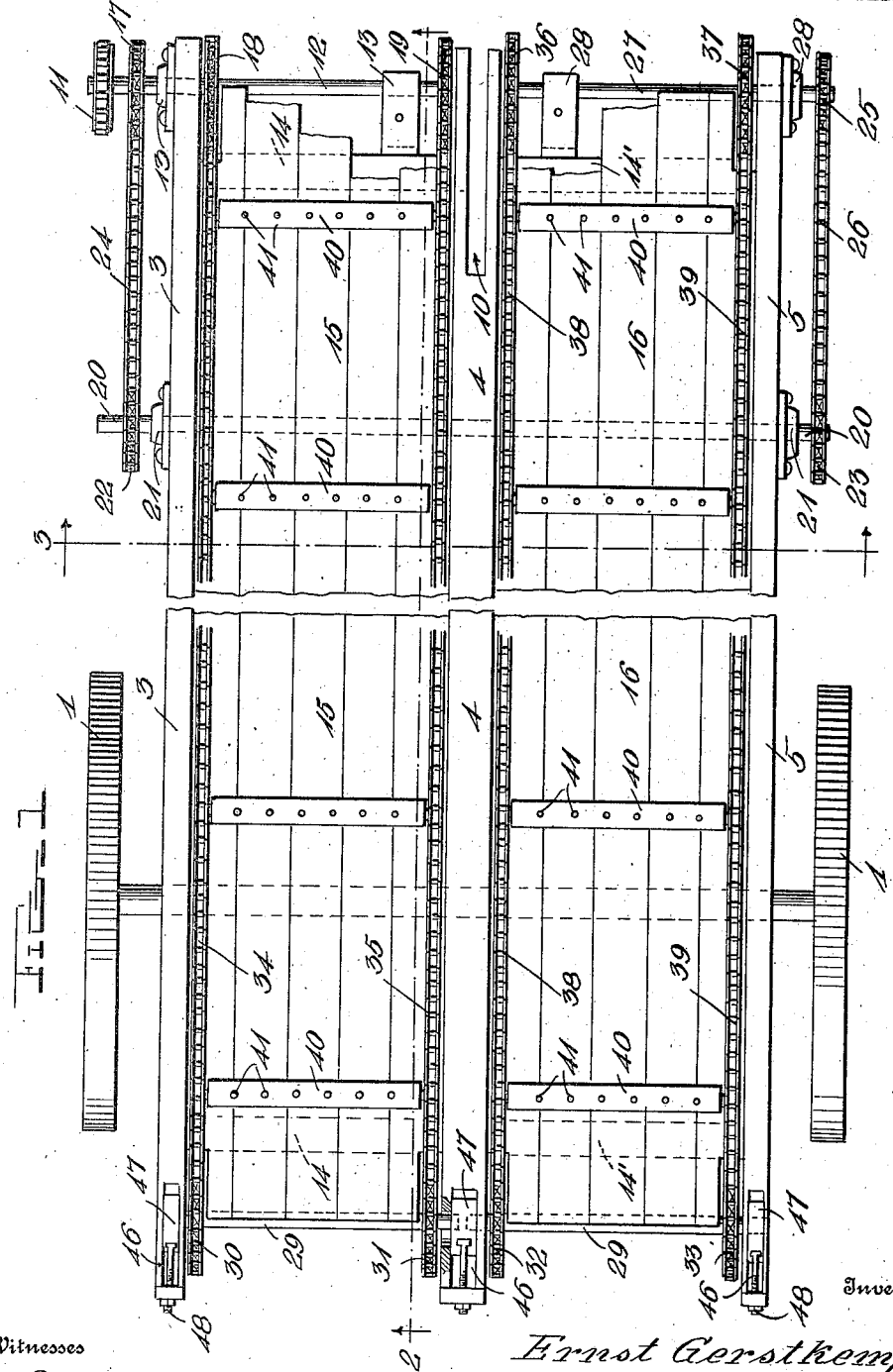
Witnesses
Inventor
Ernst Gerstkemper
By John S. Duffie
Attorney E. GERSTKEMPER.
MOUNTED EXTENSION FOR BAND CUTTERS AND FEEDERS.
APPLICATION FILED SEPT. 23, 1908.
915,425.
Patented Mar. 16, 1909.
2 SHEETS—SHEET 2.
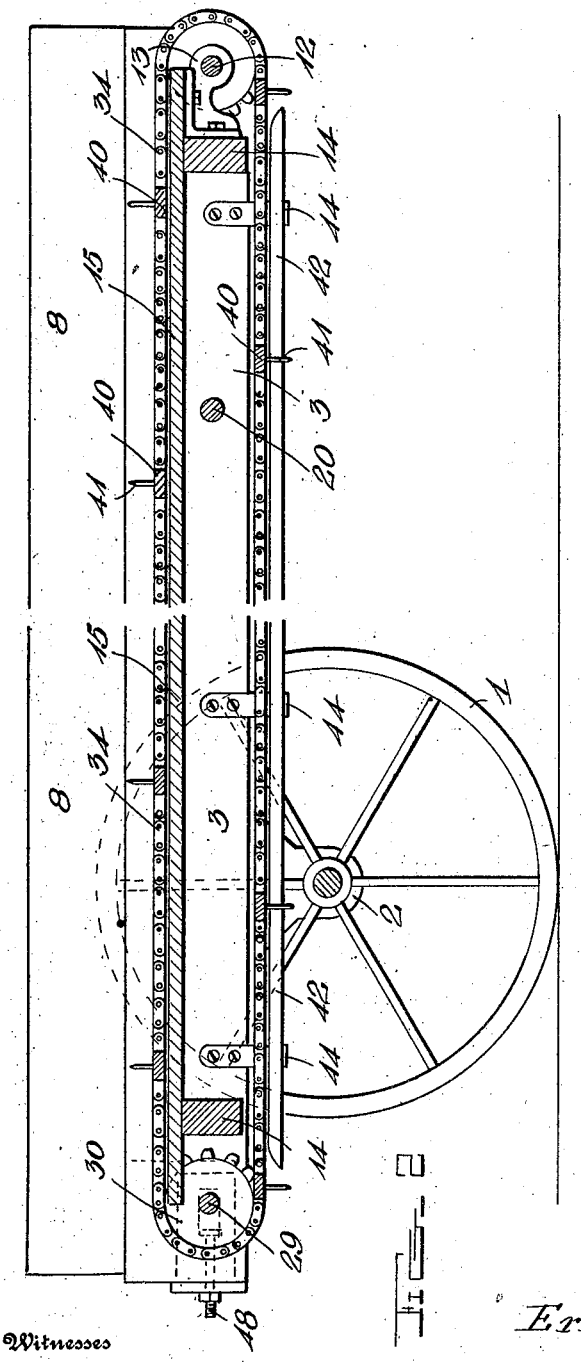
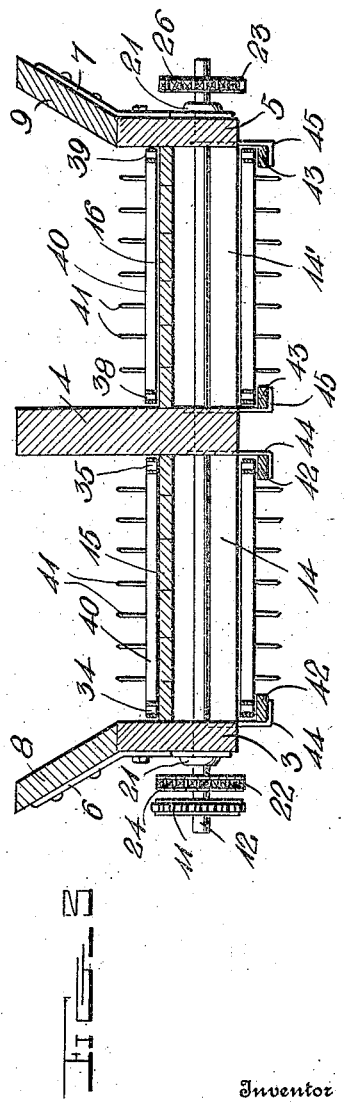
Inventor
Ernst Gerstkemper
Witnesses
By
Attorney

UNITED STATES PATENT OFFICE.

ERNST GERSTKEMPER, OF HOYLETON, ILLINOIS.

MOUNTED EXTENSION FOR BAND-CUTTERS AND FEEDERS.

No. 915,425.  Specification of Letters Patent.  Patented March 16, 1909.

Application filed September 23, 1908. Serial No. 454,389.

*To all whom it may concern:*

Be it known that I, ERNST GERSTKEMPER, a citizen of the United States, residing at Hoyleton, in the county of Washington and State of Illinois, have invented certain new and useful Improvements in Mounted Extensions for Band-Cutters and Feeders, of which the following is a specification.

My invention has relation to new and useful improvements in mounted extension for band cutter and feeder for bundle or bound grain only.

My invention has nothing to do with improvements on a band cutter and feeder, but my improvements reside in the extension used in connection with said band cutter and feeder for bundle grain only, it not being my intention to use this device in connection with headed grain.

The object of my invention is to make the feed longer, more flexible, and at the same time, to enable the operator to more efficiently manipulate his machine, without having to move the same when between four stacks of wheat or rye.

With these ends in view said invention consists in the novel construction and combination of parts, substantially as and for the purposes hereinafter specified and particularly pointed out in the claims hereunto appended.

Reference being had to the drawings:—
Figure 1 is a top plan view of my device, parts broken away. Fig. 2 is a longitudinal sectional view of my invention taken on the line 2—2 of Fig. 1. Fig. 3 is a transverse sectional view taken on the line 3—3 of Fig. 1.

Referring more particularly to the drawings, my invention is described as follows:—

Mounted on the wheels 1, by means of any well known bearings 2, are the longitudinal beams 3, 4 and 5. Held securely against the upper edges of said beams 3 and 5, and slanting outwardly toward the left and right respectively, by means of the angle irons 6 and 7, are the guards 8 and 9. Said beam 4, extends upwardly a sufficient distance so that its upper edge is on a level with the upper edges of said guards 8 and 9, forming a partition or center-board. This centerboard has a longitudinal slot 10, cut at its rear end, wherein the center-board of the cutter and feeder is fitted to hold said extension in position.

The beams 3, 4 and 5, are securely held together by means of the crosspieces 14 and $14^1$. Mounted between each two of said longitudinal beams and supported by said crosspieces are the floors 15 and 16. Power is transmitted to this device by means of the sprocket wheel 11, keyed to the outer end of the shaft 12, which is journaled in suitable bearings 13, of said crosspiece 14. The sprocket wheels 17, 18 and 19, are also keyed to said shaft 12. A shaft 20, journaled between suitable bearings 21, has the sprocket wheels 22 or 23, keyed to the outer ends thereof. A sprocket drive chain 24, transmits the power from said sprocket wheel 17, to said sprocket wheel 22, said power being transferred to said sprocket wheel 23, by means of the shaft 20, and thence to a sprocket wheel 25, by means of a sprocket drive chain 26. Said sprocket wheel 25, is keyed to the outer end of the shaft 27, mounted between the bearings 28, of said crosspiece 14. Shafts 29, passing through suitable holes in said longitudinal beams, as bearings, have keyed thereto the sprocket wheels 30, 31, 32 and 33. Working on the sprocket wheels 18 and 30, and 19 and 31, are the endless sprocket chains 34 and 35, respectively. Working on a sprocket wheel 36, and said sprocket wheel 32, and on a sprocket wheel 37, and said sprocket wheel 33, are similar chains 38 and 39, respectively. The cleats 40, provided with pins 41, have their ends secured to said chains 38 and 39, 34 and 35, at certain spaced intervals apart, respectively. Longitudinal slats 42 and 43, held in position by means of the angle irons 44 and 45, are for the purpose of preventing the chains 34, 35, 38 and 39, from sagging while returning to the forward end of said extension. So that the tension upon the chains which carry said cleats 40, may be increased or diminshed, slots 46, are cut in the forward ends of said longitudinal beams, making it possible to move said spindle 29, forwardly or rearwardly as desired, by means of the adjustable blocks 47, controlled by the bolts and nuts 48.

Though I have specifically described my invention, I may exercise the right to make such alterations or modifications in the general form of the construction and arrangement of the several parts of my invention as do not depart from the spirit of the claims hereunto appended.

Having described my invention, what I claim as new and desire to secure by Letters Patent is:—

1. In a device of the character described, three longitudinal beams held securely together by means of crosspieces, floors provided between each outer and the central of said longitudinal beams, each of said outer beams provided with an outwardly slanting guard held substantially in position by means of angle irons, the rear end of said central longitudinal beam being provided with a longitudinal slot for the reception of the center-board of the band cutter and feeder to which this device is attached, said central longitudinal beam extending upwardly a sufficient distance that its upper edge is approximately on a level with said guides, enabling it to act as a center-board in itself, a shaft 12, mounted between bearings 13, said shaft provided with means at its outer end for the reception of power, a shaft 20, journaled between bearings 21, provided at either end with sprocket wheels, means for the transmission of power from said shaft 12, to the last-named shaft, a shaft 27, journaled in bearings 28, said shaft provided with a sprocket wheel at its outer end, means consisting of a sprocket chain to transmit power from said shaft 20, to said shaft 27, four endless sprocket chains driven by means of sprocket wheels keyed to said shafts 12 and 27, said endless sprocket chains working over sprocket wheels keyed to the shafts 29, a number of cleats provided with pins having their ends secured to said sprocket chains, the entire structure adapted to be mounted upon wheels, substantially as shown and described.

2. In a device of the class described, three longitudinal beams held securely together by means of cross-pieces, floors provided between each outer and the central of said longitudinal beams, each of said outer beams provided with a guard held in position by means of angle irons, the rear end of said central longitudinal beam adapted for engagement with the center-board of the band-cutter and feeder to which this device is attached, said central longitudinal beam being of sufficient height to enable it to act as a center-board, a shaft 12 mounted between suitable bearings, means at one end of said shaft to transmit power thereto, a shaft 20 journaled between suitable bearings, a sprocket wheel at each end thereof, means to transmit power from said shaft 12 to said last-mentioned shaft, a shaft 27 journaled in suitable bearings, a sprocket wheel provided at the outer end thereof, means to transmit power from said shaft 20 to said shaft 27, a plurality of endless sprocket chains driven by means of sprocket wheels keyed to said shafts 12 and 27, said endless sprocket chains working over sprocket wheels keyed to the shafts 29, a number of cleats whose outer ends are secured to said sprocket chains arranged at predetermined intervals apart, substantially as and for the purposes set forth.

In testimony whereof I affix my signature, in presence of two witnesses.

ERNST GERSTKEMPER.

Witnesses:
J. J. HAWKINS,
H. F. HECKERT.